United States Patent
Hsu et al.

(10) Patent No.: US 12,434,753 B2
(45) Date of Patent: *Oct. 7, 2025

(54) TRANSPORTING APPARATUS WITH SHOCK ABSORBING ELEMENTS

(71) Applicant: Taiwan Semiconductor Manufacturing Co., Ltd., Hsinchu (TW)

(72) Inventors: Yueh-Sheng Hsu, Taoyuan County (TW); Liang-Kun Zhu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,726

(22) Filed: May 13, 2024

(65) Prior Publication Data

US 2024/0294202 A1 Sep. 5, 2024

Related U.S. Application Data

(63) Continuation of application No. 18/175,160, filed on Feb. 27, 2023, now Pat. No. 12,017,695, which is a
(Continued)

(51) Int. Cl.
*B62B 5/00* (2006.01)
*B62B 3/00* (2006.01)
(Continued)

(52) U.S. Cl.
CPC ............ *B62B 5/0006* (2013.01); *B62B 3/005* (2013.01); *B62B 3/04* (2013.01); *B62B 3/10* (2013.01);
(Continued)

(58) Field of Classification Search
CPC ......... B62B 5/0006; B62B 3/005; B62B 3/04; B62B 3/10; B62B 5/0096; B62B 2203/70;
(Continued)

(56) References Cited

U.S. PATENT DOCUMENTS 4,566,678 A * 1/1986 Anderson ............... F16F 1/422
267/141.1
5,647,600 A 7/1997 Booras
(Continued)

FOREIGN PATENT DOCUMENTS

CN 101229816 A 7/2008
CN 201685839 U * 12/2010
(Continued)

OTHER PUBLICATIONS

Translated KR-20090009357-U (Year: 2024).*
Translated KR-20090009357-U (Year: 2022).

*Primary Examiner* — James A Shriver, II
*Assistant Examiner* — Ian Bryce Shelton
(74) *Attorney, Agent, or Firm* — Sterne, Kessler, Goldstein &Fox P.L.L.C.

(57) ABSTRACT

The present disclosure provides a transporting apparatus. The transporting apparatus can include the following components: a first frame support configured to support an object; a second frame support configured to roll the transporting apparatus and to move relative to the first frame support; and a plurality of shock absorbing elements positioned between the first frame support and the second frame support.

20 Claims, 4 Drawing Sheets

Related U.S. Application Data continuation of application No. 16/442,038, filed on Jun. 14, 2019, now Pat. No. 11,590,996.

(60) Provisional application No. 62/712,639, filed on Jul. 31, 2018.

(51) Int. Cl.
 *B62B 3/04* (2006.01)
 *B62B 3/10* (2006.01)

(52) U.S. Cl.
 CPC ........ *B62B 5/0096* (2013.01); *B62B 2203/70* (2013.01); *B62B 2501/065* (2013.01)

(58) Field of Classification Search
 CPC ..... B62B 2501/065; B62B 3/104; B62B 5/00; B62B 2202/00
 See application file for complete search history.

(56) References Cited

U.S. PATENT DOCUMENTS

| | | | |
|---|---|---|---|
| 5,718,441 A | 2/1998 | Kern et al. | |
| 5,845,914 A * | 12/1998 | Lenkman | B60G 99/00 280/43.23 |
| 6,454,512 B1 | 9/2002 | Weiss | |
| 7,604,306 B1 * | 10/2009 | Cheng | B62B 3/005 312/351 |
| 9,004,300 B1 | 4/2015 | Morrell | |
| 9,808,545 B2 * | 11/2017 | Mauzerall | A47B 91/16 |
| 10,034,721 B1 | 7/2018 | Timm et al. | |
| 10,792,119 B2 | 10/2020 | Timm et al. | |
| 2015/0344051 A1 * | 12/2015 | Lenkman | B62B 3/02 248/638 |
| 2015/0344054 A1 * | 12/2015 | Lenkman | B62B 3/04 280/47.35 |
| 2016/0214789 A1 * | 7/2016 | Stumpf | B65D 90/18 |
| 2019/0073656 A1 * | 3/2019 | Joseph | G06Q 20/40145 |
| 2021/0206415 A1 * | 7/2021 | Kumazawa | B62B 5/067 |
| 2023/0219609 A1 | 7/2023 | Hsu et al. | |

FOREIGN PATENT DOCUMENTS

| | | | | |
|---|---|---|---|---|
| CN | 102310982 A | * | 1/2012 | |
| CN | 205417717 U | * | 8/2016 | |
| CN | 106449879 A | * | 2/2017 | |
| CN | 106828558 A | | 6/2017 | |
| CN | 106891921 A | * | 6/2017 | B62B 3/02 |
| KR | 20090009357 U | * | 8/2009 | |
| KR | 101511731 B1 | * | 4/2015 | |

\* cited by examiner

TRANSPORTING APPARATUS WITH SHOCK ABSORBING ELEMENTS

CROSS-REFERENCE TO RELATED APPLICATIONS

This application is a continuation application of U.S. patent application Ser. No. 18/175,160, filed on Feb. 27, 2023, titled "Transporting Apparatus with Shock Absorbing Elements," which is a continuation application of U.S. patent application Ser. No. 16/442,038, filed on Jun. 14, 2019, titled "Transporting Apparatus with Shock Absorbing Elements," now U.S. Pat. No. 11,590,996, which claims the benefit of U.S. Provisional Patent Application No. 62/712,639, titled "Anti-Chipping Wafer Holder with Suspended Air Cushion," filed Jul. 31, 2018, the disclosures of which are incorporated herein by reference in their entireties.

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs.

As semiconductor manufacturing has grown in complexity, it becomes increasingly necessary to transport wafers among a number of different process modules or clusters of process modules, and sometimes between tools and modules that are separated by significant distances. Transport between different process facilities often results in increased risk of wafer damage (e.g., bevel defects, chipping defects, die shift, crack, and molding loss) due to shock and vibration of the wafer transporting apparatus.

BRIEF DESCRIPTION OF THE DRAWINGS

Aspects of the present disclosure are best understood from the following detailed description when read with the accompanying figures. In accordance with the common practice in the industry, various features are not drawn to scale. In fact, the dimensions of the various features can be arbitrarily increased or reduced for clarity of illustration and discussion.

DETAILED DESCRIPTION

Figure 1:
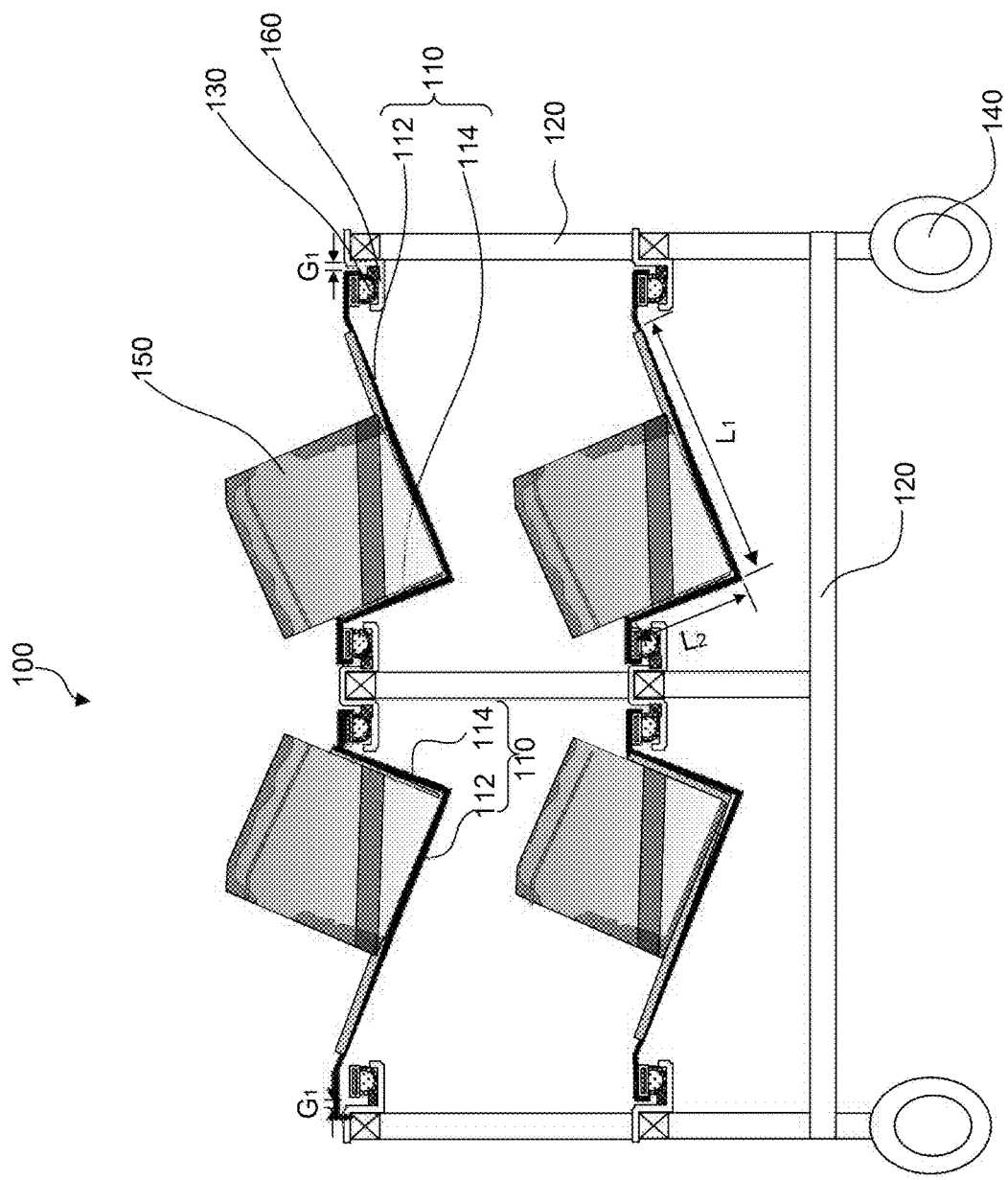
FIG. 1 is a side view of a schematic of a transporting apparatus, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows can include embodiments in which the first and second features are formed in direct contact, and can also include embodiments in which additional features are disposed between the first and second features, such that the first and second features are not in direct contact. In addition, the present disclosure can repeat reference numerals and/or letters in the various examples. This repetition does not in itself dictate a relationship between the various embodiments and/or configurations discussed.

Further, spatially relative terms, such as "beneath," "below," "lower," "above," "upper," and the like, can be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein can likewise be interpreted accordingly.

The term "nominal" as used herein refers to a desired, or target, value of a characteristic or parameter for a component or a process operation, set during the design phase of a product or a process, together with a range of values above and/or below the desired value. The range of values can be due to slight variations in manufacturing processes or tolerances.

The term "horizontal," as used herein, means nominally parallel to a level ground.

The term "vertical," as used herein, means nominally perpendicular to a level ground.

The term "substantially" as used herein indicates the value of a given quantity that can vary based on a particular technology node associated with the subject semiconductor device. In some embodiments, based on the particular technology node, the term "substantially" can indicate a value of a given quantity that varies within, for example, ±5% of a target (or intended) value.

The term "about" as used herein indicates the value of a given quantity that can vary based on a particular technology node associated with the subject semiconductor device. In some embodiments, based on the particular technology node, the term "about" can indicate a value of a given quantity that varies within, for example, 5-30% of the value (e.g., ±5%, ±10%, ±20%, or ±30% of the value).

In semiconductor manufacturing, semiconductor wafers must be safely transported between processing stations without damaging or destroying the wafers. Semiconductor wafers can be retained in a clean room environment during processing to preserve the purity of the layers deposited on the wafers. For additional protection against contaminants, the semiconductor wafers can be retained in sealed transport containers as they are moved throughout the clean room to minimize any exposure to the environment outside of the processing stations.

External air entering the cleanroom is filtered to exclude dust, and the air inside the cleanroom is constantly recirculated through high-efficiency particulate air (HEPA) and/or ultra-low particulate air (ULPA) filters to remove internally generated contaminants. Cleanrooms maintain particulate-free air through the use of either HEPA or ULPA filters employing laminar or turbulent air flow principles. Laminar, or unidirectional, air flow systems direct filtered air downward or in horizontal direction in a constant stream towards filters located on walls near the cleanroom floor and through raised perforated floor panels to be recirculated. Turbulent, or non-unidirectional, air flow uses both laminar air flow hoods and nonspecific velocity filters to keep air in a cleanroom in constant motion, although not all in the same direction. The rough air seeks to trap particles that may be in the air and drive them towards the perforated floor, where they enter filters and leave the cleanroom environment.

However, the perforated floor can shock and vibrate a wafer transporting apparatus (e.g., wafer transport trolley, automated material handling systems, or automated guided vehicle) that travels on the floor. And the excessive shock and vibration can damage wafers, causing beveled edges, chipping defects, die shifts, cracks, and molding losses.

This disclosure is directed to a transporting apparatus that includes a first frame support, a second frame support, and shock absorbing elements positioned between the first and second frame supports. The first and second frame supports are not in direct contact with each other, according to some embodiments. The shock absorbing elements serve as an air cushion suspension system to reduce shock and vibration when the transporting apparatus moves in the fabrication facility. Such transporting apparatus can be integrated into various wafer transporting systems including, but not limited to, wafer trolleys, automated material handling systems, and automated guided vehicles.

Figure 2:
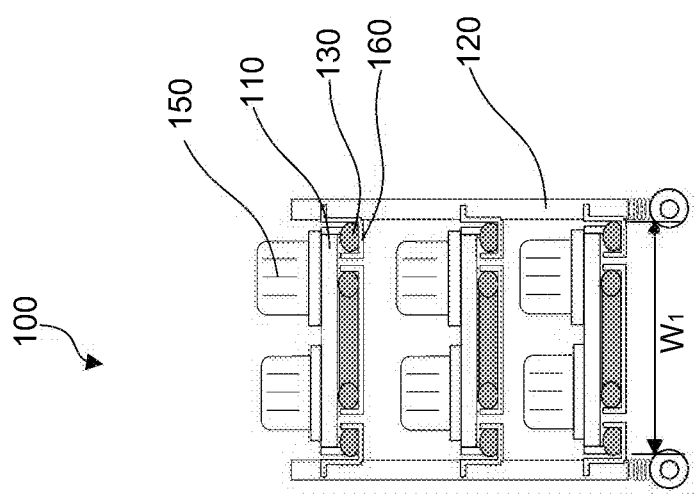
FIG. 2 is another side view of a schematic of a transporting apparatus, in accordance with some embodiments of the present disclosure.

FIG. 1 is a side view (viewing from the y-direction) of a schematic of a transporting apparatus 100, in accordance with some embodiments of the present disclosure. FIG. 2 is a side view (viewing from the x-direction) of a schematic of a transporting apparatus 100, in accordance with some embodiments of the present disclosure. As illustrated in FIG. 1, transporting apparatus 100 can include a first frame support 110 configured to support an object 150 on a floor surface (e.g., perforated floor in a clean room); a second frame support 120 configured to provide support for first frame support 110 and roll transporting apparatus 100 on the floor surface; and a plurality of shock absorbing elements 130 positioned between first frame support 110 and second frame support 120. In some embodiments, second frame support 120 can be a rolling frame support. The rolling frame support can include a plurality of rollers (e.g., wheels or casters) to provide the rolling movement for transporting apparatus 100 on the floor surface. In some embodiments, first frame support 110 and second frame support 120 are not in direct contact and separated by shock absorbing elements 130. Shocking absorbing elements 130 can be an elastic material and deform under shock and vibration. Second frame support 120 can be movable relative to first frame support 110. In some embodiments, transporting apparatus 100 can further include a sealed, nitrogen-purged plastic shell to create a low-humidity transport and storage environment.

In some embodiments, first frame support 110 can include a plurality of V-shaped shelves configured to support an object (e.g., a wafer cassette 150). In some embodiments, the object can also be a wafer pod, a front opening unified pod (FOUP), or any other semiconductor carrier. In some embodiments, the object can be sensitive equipment or devices, such as medical systems, flat panel displays, and/or computer hardware. Each V-shaped shelf can include two panels: a first panel 112 and a second panel 114. In some embodiments, first panel 112 and second panel 114 are connected to each other and form an angle between the two panels. The angle can be between about 90 degrees and about 135 degrees (e.g., about 90 degrees, about 100 degrees, about 110 degrees, about 120 degrees, or about 135 degrees). In some embodiments, the angle can be adjusted based on the shape of the object to secure the object in position on the V-shaped shelf.

In some embodiments, first panel 112 and second panel 114 can have the same length. In some embodiments, first panel 112 and second panel 114 can have different lengths. In some embodiments, first panel 112 can have a first length ($L_1$ in FIG. 1) between about 350 mm and about 650 mm (e.g., about 350 mm, about 450 mm, about 550 mm, or about 650 mm). In some embodiments, second panel 114 can have a second length ($L_2$ in FIG. 1) between about 250 mm and about 450 mm (e.g., about 250 mm, about 350 mm, about 450 mm). In some embodiments, first panel 112 and second panel 114 can have the same width ($W_1$ in FIG. 2). In some embodiments, first panel 112 and second panel 114 can have a width ($W_1$ in FIG. 2) between about 500 mm and about 800 mm (e.g., about 500 mm, about 600 mm, about 700 mm, or about 800 mm).

The V-shaped shelves can be made of materials including, but not limited to, stainless steel, copper, aluminum, carbon steel, or a combination thereof. In some embodiments, the surface of the V-shaped shelves has an electropolished finish to improve the smoothness of the V-shaped shelf surface to minimize dust trapping during transportation. In some embodiments, the V-shaped shelf is perforated. The diameter of the perforated holes on the perforated V-shaped shelf can be between about 3 mm and about 50 mm (e.g., about 3 mm, about 5 mm, about 10 mm, about 20 mm, about 30 mm, about 40 mm, or about 50 mm). In some embodiments, the V-shaped shelves have perforated holes with a diameter of about 15 mm to optimize air flow-through and minimize particle accumulation. In some embodiments, transporting apparatus 100 can include between about one and about twelve V-shaped shelves (e.g., four V-shape shelves in FIG. 1 and six V-shape shelves in FIG. 2).

In some embodiments, second frame support 120 can include a plurality of bars and rods configured to support first frame support 110. In some embodiments, second frame support 120 can further include one or more handles configured to provide gripping support (e.g., clean room technicians) to move transporting apparatus 100 manually. In some embodiments, second frame support 120 and first frame support 110 are not in direct contact with each other and separated by shock absorbing elements positioned between the two frame supports. First frame support 110 and second frame support 120 can have a gap (e.g., $G_1$ in FIG. 1) between about 3 mm and about 15 mm (e.g., about 3 mm, about 5 mm, about 7 mm, about 9 mm, about 11 mm, about 13 mm, or about 15 mm). In some embodiments, each bar and rod can have a diameter between about 10 mm and about 100 mm (e.g., 20 mm, 40 mm, 60 mm, or 80 mm).

Second frame support 120 can be made of materials including, but not limited to, stainless steel, copper, aluminum, carbon steel, or a combination thereof. In some embodiments, the surface of second frame support 120 has an electropolished finish to improve the smoothness of the V-shaped shelf surface to minimize dust trapping during transportation. In some embodiments, second frame support 120 includes the same materials as that of first frame support 110. In some embodiments, second frame support 120 includes different materials as that of first frame support 110.

In some embodiments, second frame support 120 can further include a plurality of rollers 140 configured to roll transferring apparatus 100 from a first location to a second location. In some embodiments, plurality of rollers 140 can be, but is not limited to, a plurality of wheels or a plurality of casters. In some embodiments, plurality of rollers 140 can provide rolling movements in all directions. In some embodiments, plurality of rollers 140 can include a polymeric material including, but not limited to, polyurethane, polyisoprene, polybutadiene, chloroprene rubber, polychloroprene, neoprene, baypren, butyl rubber, halogenated butyl rubbers, styrene-butadiene rubber, nitrile rubber, ethylene propylene rubber, ethylene propylene diene rubber, epichlorohydrin rubber, polyacrylic rubber, silicone rubber, fluorosilicone rubber, fluoroelastomers, viton, tecnoflon, fluorel, perfluoroelastomers, polyether block amides, chlorosulfonated polyethylene, ethylene-vinyl acetate, or a combination thereof. In some embodiments, plurality of rollers 140 can include a plurality of spring-loaded locking polyurethane casters to ensure smooth rolling to protect objects (e.g., wafers) during transit. In some embodiments, transporting apparatus 100 can include 3, 4, 6, or 8 rollers.

Shock absorbing element 130 can be positioned between first frame support 110 and second frame support 120. In some embodiments, first frame support 110 and/or second frame support 120 can have a socket structure 160 to secure shock absorbing element 130 in place and reduce lateral movements between first frame support 110 and second frame support 120. In some embodiments, socket structure 160 can be made of materials including, but not limited to, stainless steel, copper, aluminum, carbon steel, or a combination thereof. In some embodiments, socket structure 160 can be made of materials including, but not limited to, polyvinyl alcohol, polyvinyl chloride, polytetrafluoroethylene, polyurethane, polyethylene terephthalate, polyethylene, polystyrene, polypropylene, polycarbonate, or a combination thereof.

In some embodiments, shock absorbing element 130 can include a plurality of inflatable pneumatic shock absorbing elements. Shock absorbing element 130 can be a sealed structure with a hollow center. In some embodiments, shock absorbing element 130 can include an air cushion suspension system. In some embodiments, shock absorbing element 130 includes a polymer. The polymer can have a shore hardness from about 5 shore 00 to about 90 shore A, from about 20 shore 00 to about 80 shore A, or from about 40 shore 00 to about 70 shore A.

In some embodiments, shock absorbing element 130 can include a polymeric material including, but not limited to, chloroprene rubber, butyl rubber, butadiene rubber, ethylene propylene, nitrile rubber, fluorocarbon, hydrogenated nitrile, poly-acrylate, silicone, polyurethane, polyisoprene, polybutadiene, chloroprene rubber, polychloroprene, neoprene, baypren, butyl rubber, halogenated butyl rubbers, styrene-butadiene rubber, ethylene propylene diene rubber, epichlorohydrin rubber, fluorosilicone rubber, fluoroelastomers, viton, tecnoflon, fluorel, perfluoroelastomers, polyether block amides, chlorosulfonated polyethylene, ethylene-vinyl acetate, or a combination thereof. In some embodiments, shock absorbing element 130 can include an elastomer. The elastomer is a polymer with viscoelasticity (i.e., both viscosity and elasticity), weak intermolecular forces, low Young's modulus, and high tensile strength compared to other materials (e.g., thermoplastic). Intermolecular forces are forces of attraction and repulsion between molecules and other neighboring particles. In some embodiments, the intermolecular forces between neighboring particles in shock absorbing element 130 is between about 0.1 and about 1 kcal/mol (e.g., about 0.1 kcal/mol, about 0.2 kcal/mol, about 0.5 kcal/mol, or about 1 kcal/mol). Young's modulus is a mechanical property that measures the stiffness of a solid material. It defines the relationship between stress (force per unit area) and strain (proportional deformation) in a material in the linear elasticity regime of a uniaxial deformation. In some embodiments, shock absorbing element 130 can have a Young's modulus between about 1 and about 10 MPa (e.g., about 1 MPa, about 2 MPa, about 5 MPa, or about 10 MPa). Tensile strength is the capacity of a material or structure to withstand loads tending to elongate. Tensile strength is measured by the maximum stress that a material can withstand while being stretched or pulled before breaking. In some embodiments, shock absorbing element 130 can have a tensile strength between about 10 and about 50 MPa (e.g., about 10 MPa, about 20 MPa, about 30 MPa, about 40 MPa, or about 50 MPa). Each monomer that forms a link of the elastomer can be a compound including carbon, hydrogen, oxygen and silicon. In some embodiments, elastomers can be amorphous polymers maintained above their glass transition temperature, so that considerable molecular reconformation, without breaking of covalent bonds, is feasible. At ambient temperatures, shock absorbing element 130 is thus relatively soft (e.g., with a Young's modulus of about 3 MPa) and deformable. In some embodiments, a compressibility of shock absorbing element 130 ranges from about 1% to about 50%. Compressibility is a measure of a change in volume of shock absorbing element 130 at a native state to a volume during the transportation process. In some embodiments, compressibility is determined based on an equation $C=(T_1-T_2)/T_1 \times 100$, where C is compressibility, $T_1$ is a thickness of a sample experiencing a compressive stress of about 300 $g/cm^2$, and $T_2$ is a thickness of the sample experiencing a compressive stress of about 1800 $g/cm^2$. The thickness measurements are made using constant compressive stress at a temperature of about 25° C.

Figure 3:
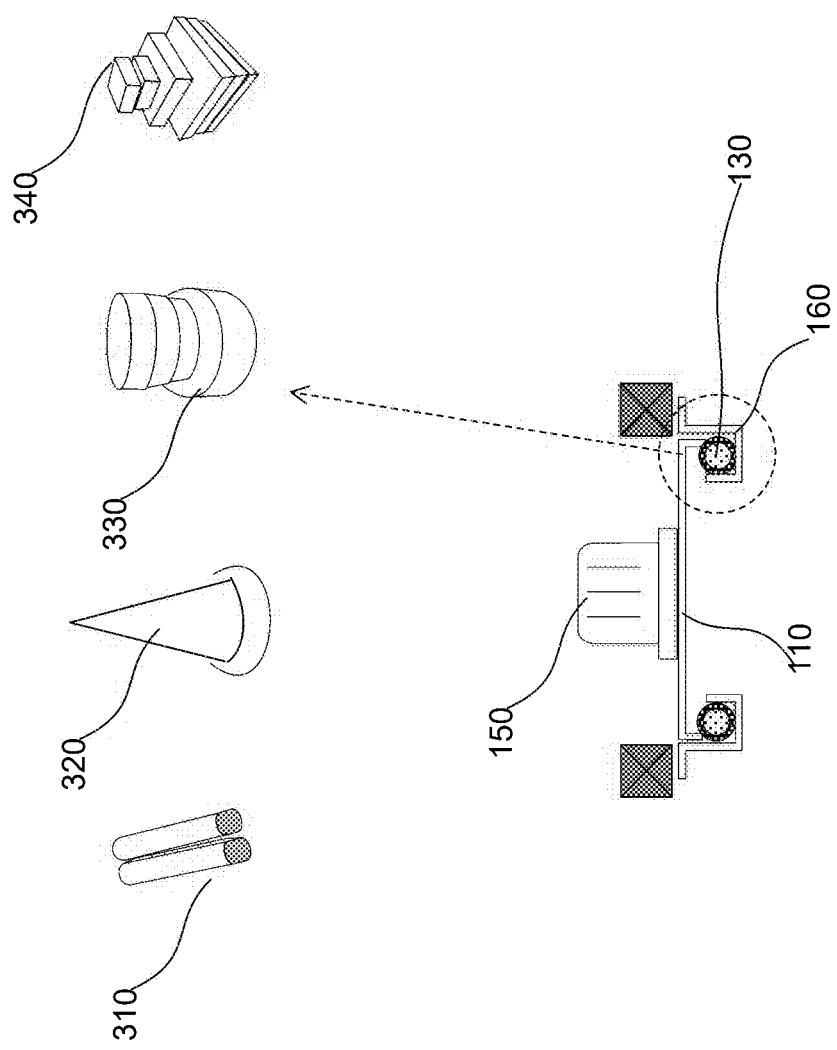
FIG. 3 is a schematic showing a plurality of shock absorbing elements with various shapes, in accordance with some embodiments of the present disclosure.

FIG. 3 a schematic showing a plurality of shock absorbing elements with various shapes, in accordance with some embodiments of the present disclosure. Shock absorbing element 130 can include a spherical component, an elliptical component, a disk shape component, a cubical component, a conical component, a pyramidal component, a cylindrical component, or a combination thereof. In some embodiments, the spherical component can have a diameter between about 30 mm and about 50 mm (e.g., about 30 mm, about 40 mm, or about 50 mm). In some embodiments, the conical component can have a diameter between about 30 mm and 50 mm (e.g., about 30 mm, about 40 mm, or about 50 mm) and a height between about 30 mm and 50 mm (e.g., about 30 mm, about 40 mm, or about 50 mm). In some embodiments, the cylindrical component can have a diameter between about 30 mm and 50 mm (e.g., about 30 mm, about 40 mm, or about 50 mm) and a height between 20 mm and 50 mm (e.g., about 20 mm, about 30 mm, about 40 mm, or about 50 mm). In some embodiments, the cubical component can have a cube side length between 20 mm and 50 mm (e.g., about 20 mm, about 30 mm, about 40 mm, or about 50 mm).

In some embodiments, shock absorbing element 130 can be a hollow article with a gas inside to provide air cushion for improved shock reduction. Shock absorbing element 130 can be filled with air or nitrogen and can have an internal air pressure between about 11 psi and about 18 psi (e.g., about 11 psi, about 13 psi, about 15 psi, or about 18 psi). In some embodiments, shock absorbing element 130 is a hollow sphere with an outside diameter between about 30 mm and about 50 mm (e.g., about 30 mm, about 40 mm, or about 50 mm) and a thickness between about 2 and about 10 mm (e.g., about 2 mm, about 4 mm, about 6 mm, about 8 mm, or about 10 mm). In some embodiments, shock absorbing element 130 can include a plurality of components with the same or different shapes (e.g., two cylindrical components shock absorbing element 310, a conical component and a disk shape component shock absorbing element 320, four cylindrical components shock absorbing element 330, and stacked cubical components shock absorbing element 340).

In some embodiments, transporting apparatus 100 can further include RFID reading devices and a display located on transporting apparatus 100 (e.g., on second frame support 120). Each of the objects (e.g., wafer cassette 150 in FIG. 1) can be equipped with an RFID tag device that communicates via Wi-Fi with the RFID reading devices on transporting apparatus 100. The display on transporting apparatus 100 displays the ID and the destination of the objects being transported. Such information can be sent via Wi-Fi to track the location and status of the objects being transferred by transporting apparatus 100.

In some embodiments, transporting apparatus 100 can be an automated transporting apparatus powered by power of various forms, such as DC current, AC current, battery, etc. Transporting apparatus 100 can include: a first frame support configured to support an object on a floor surface; a second frame support configured to provide rolling movement of the transporting apparatus on the floor surface, in which the second frame support moves relative to the first frame support; a plurality of shock absorbing elements positioned between the first frame support and the second frame support; a robotic arm configured to load and unload the object (e.g., wafer cassette 150 in FIG. 1); an identification (ID) sensing device configured to read RFID tag information on the object; and a control unit that controls various operations of transporting apparatus 100. For example, the control unit can control the communication between transporting apparatus 100 and a central controller, the automated loading and unloading of the object (e.g., wafer cassette 150 in FIG. 1), the robotic arm, the detection of ID signals by ID sensing device, the transmission and processing of the sensed ID signals, or any combination thereof.

The control unit can include suitable software and hardware, such as computer programs stored in a memory, and a processor and related circuitry to execute various operations. In some embodiments, transporting apparatus 100 stores a map of the fabrication facility and is installed with suitable positioning systems, so that transporting apparatus 100 can move in the fabrication facility based on designated routes. For example, the control unit of transporting apparatus 100 can include a global positioning system (GPS) receiver, a receiving device/program with a Bluetooth-based indoor positioning system, and/or a receiving device/program with a Wi-Fi-based indoor positioning system for navigating in the fabrication facility according to the indoor map. The fabrication facility can include corresponding devices for the indoor positioning system, such as Bluetooth beacons and/or Wi-Fi access points distributed at various locations for the indoor positioning functions. The control unit can be arranged at any suitable position of transporting apparatus 100. In some embodiments, the control unit is positioned on second frame support 120.

The central controller can include any suitable computer system that controls the overall operation of transporting apparatus 100 and receiving devices (e.g., tablet and cell phone). The receiving devices can include any suitable portable device and can be used for communication with central controller. In some embodiments, each receiving device includes a processor and related circuitry for processing and responding to the notifications/commands transmitted by the central controller. For example, central controller can receive real-time data from transporting apparatus 100 and transmit notifications including the real-time status of transporting apparatus 100 to the receiving device. Both transporting apparatus 100 and receiving devices can communicate with the central controller through communication network. Communication network can be a suitable wired or wireless communication means. In some embodiments, communication networks include Wi-Fi.

Figure 4:
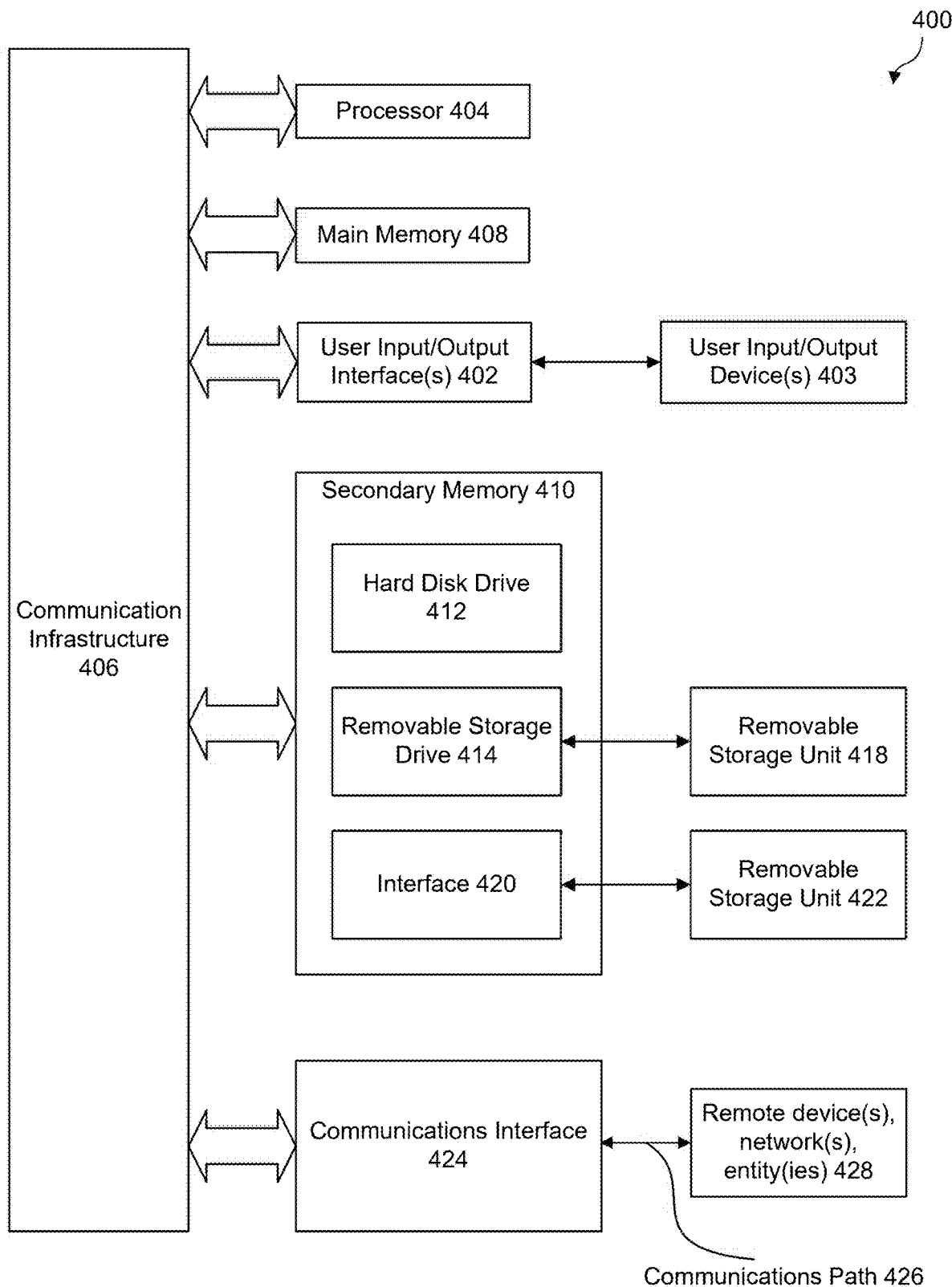
FIG. 4 is an illustration of an exemplary computer system in which various embodiments of the present disclosure can be implemented.

FIG. 4 is an illustration of an exemplary computer system 400 in which various embodiments of the present disclosure can be implemented, according to some embodiments. Computer system can be used in the control unit of the transporting apparatus, the RFID tag of the wafer cassette, the receiving devices, and the central controller, as described above. Computer system 400 can be any well-known computer capable of performing the functions and operations described herein. For example, and without limitation, computer system 400 can be capable of processing and transmitting signals. Computer system 400 can be used, for example, to execute one or more functions of the transporting apparatus.

Computer system 400 can include one or more processors (also called central processing units, or CPUs), such as a processor 404. Processor 404 is connected to a communication infrastructure or bus 406. Computer system 400 also includes input/output device(s) 403, such as monitors, keyboards, pointing devices, etc., that communicate with communication infrastructure or bus 406 through input/output interface(s) 402. Computer system 400 can receive instructions to implement functions and operations described herein—e.g., functions of the transporting apparatus—via input/output device(s) 403. Computer system 400 also includes a main or primary memory 408, such as random access memory (RAM). Main memory 408 can include one or more levels of cache. Main memory 408 has stored therein control logic (e.g., computer software) and/or data. In some embodiments, the control logic (e.g., computer software) and/or data can include one or more of the functions described above with respect to the container.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to some embodiments, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. In some embodiments, secondary memory 410, removable storage unit 418, and/or removable storage unit 422 can include one or more of the functions described above with respect to the transporting apparatus.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with element 428 (remote device(s), network(s), entity(ies) 428) over communications path 426, which can be wired and/or wireless, and which can include any combination of LANs, WANs, the Internet, etc. Control logic and/or data can be transmitted to and from computer system 400 via communication path 426.

The functions/operations in the preceding embodiments can be implemented in a wide variety of configurations and architectures. Therefore, some or all of the operations in the preceding embodiments—e.g., functions of the transporting apparatus and the central controller—can be performed in hardware, in software or both. In some embodiments, a tangible apparatus or article of manufacture including a tangible computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein. In some embodiments, computer system 400 includes hardware/equipment for the manufacturing of semiconductor wafer and circuit fabrication. For example, the hardware/equipment can be connected to or be part of element 428 (remote device(s), network(s), entity(ies) 428) of computer system 400.

This disclosure is directed to a transporting apparatus that includes a first and a second frame supports and shock absorbing elements positioned between the two frame supports. The first and second frame support are not in direct contact with each other. The shock absorbing elements serve as an air cushion suspension system to reduce shock and vibration when the transporting apparatus is in a movement.

Various embodiments in accordance with the present disclosure provide a transporting apparatus, including: a first frame support configured to support an object; a second frame support configured to roll the transporting apparatus and to move relative to the first frame support; and a plurality of shock absorbing elements positioned between the first frame support and the second frame support.

In some embodiments, a transporting apparatus provided by the present disclosure includes a first frame support configured to support an object; a second frame support configured to support the first frame support and to move relative to the first frame support; and a plurality of shock absorbing elements positioned between the first frame support and the second frame support. In some embodiments, the first and second frame supports include a gap between the two frame supports.

In some embodiments, a transporting apparatus provided by the present disclosure includes a first frame support comprising a plurality of V-shaped shelves configured to support an object; a second frame support comprising a plurality of wheels configured to move the transporting apparatus from a first location to a second location; and a plurality of shock absorbing elements positioned between the first frame support and the second frame support.

It is to be appreciated that the Detailed Description section, and not the Abstract of the Disclosure, is intended to be used to interpret the claims. The Abstract of the Disclosure section can set forth one or more but not all exemplary embodiments contemplated and thus, are not intended to be limiting to the subjoined claims.

The foregoing disclosure outlines features of several embodiments so that those skilled in the art can better understand the aspects of the present disclosure. Those skilled in the art will appreciate that they can readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they can make various changes, substitutions, and alterations herein without departing from the spirit and scope of the subjoined claims.

What is claimed is:

1. A transporting apparatus, comprising:
   a first frame support comprising a V-shaped shelf configured to support an object, wherein the V-shaped shelf comprises a horizontal end portion;
   a second frame support comprising a vertical portion configured to support the first frame support, wherein the vertical portion is separated from the first frame support; and
   a socket structure attached to the vertical portion of the second frame support and configured to hold a shock absorbing element, wherein the shock absorbing element is in contact with the horizontal end portion of the V-shaped shelf.

2. The transporting apparatus of claim 1, wherein the vertical portion is configured to support the horizontal end portion of the V-shaped shelf.

3. The transporting apparatus of claim 1, wherein the shock absorbing element comprises a polymer.

4. The transporting apparatus of claim 3, wherein the polymer comprises chloroprene rubber, butyl rubber, butadiene rubber, ethylene propylene, nitrile rubber, fluorocarbon, hydrogenated nitrile, poly-acrylate, silicone, or a combination thereof.

5. The transporting apparatus of claim 3, wherein the polymer has a shore hardness from about 5 shore 00 to about 90 shore A.

6. The transporting apparatus of claim 1, wherein the shock absorbing element comprises a spherical component, an elliptical component, a disk shape component, a cubical component, a conical component, a pyramidal component, a cylindrical component, or a combination thereof.

7. The transporting apparatus of claim 1, wherein the shock absorbing element comprises a hollow element with a gas inside.

8. The transporting apparatus of claim 7, wherein the gas comprises air with a pressure between about 11 psi and about 18 psi.

9. The transporting apparatus of claim 1, wherein the shock absorbing element comprises a hollow sphere with an outside diameter between about 30 mm and about 50 mm and a thickness between about 2 mm and about 10 mm.

10. The transporting apparatus of claim 1, further comprises a plurality of wheels connected to the second frame support and configured to move the transporting apparatus.

11. A transporting apparatus, comprising:
a first frame support comprising first and second panels connected to each other at an angle;
a second frame support comprising first and second vertical portions separated from each other;
a first shock absorbing element positioned between the first vertical portion and the first panel and configured to support the first panel; and
a second shock absorbing element positioned between the second vertical portion and the second panel and configured to support the second panel.

12. The transporting apparatus of claim 11, further comprising a plurality of rollers connected to the second frame support and configured to roll the transporting apparatus.

13. The transporting apparatus of claim 11, wherein a gap between the first panel and the first vertical portion ranges from about 3 mm to about 15 mm.

14. The transporting apparatus of claim 11, further comprising:
a first socket structure attached to the first vertical portion of the second frame support and configured to hold the first shock absorbing element; and
a second socket structure attached to the second vertical portion of the second frame support and configured to hold the second shock absorbing element.

15. A transporting apparatus, comprising:
a first frame support comprising a first horizontal end portion and a second horizontal end portion opposite to the first horizontal end portion;
a second frame support comprising first and second vertical portions configured to support the first frame;
a first socket structure attached to the first vertical portion and configured to hold a first shock absorbing element, wherein the first shock absorbing element is in contact with the first horizontal end portion; and
a second socket structure attached to the second vertical portion and configured to hold a second shock absorbing element, wherein the second shock absorbing element is in contact with the second horizontal end portion.

16. The transporting apparatus of claim 15, wherein the first frame support comprises stainless steel, copper, aluminum, carbon steel, or a combination thereof.

17. The transporting apparatus of claim 15, wherein the first frame support comprises a first panel connected to a second panel at an angle between about 90 degrees and about 135 degrees.

18. The transporting apparatus of claim 17, wherein the first panel has a first length between about 350 mm and about 650 mm, and the second panel has a second length between about 250 mm and about 450 mm.

19. The transporting apparatus of claim 15, wherein each of the first and second shock absorbing elements comprises an air cushion suspension system.

20. The transporting apparatus of claim 15, wherein each of the first and second socket structures comprises stainless steel, copper, aluminum, carbon steel, or a combination thereof.

* * * * *